(12) United States Patent
Tobinaga

(10) Patent No.: US 9,280,303 B2
(45) Date of Patent: Mar. 8, 2016

(54) MOBILE TERMINAL AND METHOD FOR SELECTING DOCUMENTS AND GENERATING PRINT REQUESTS

(71) Applicant: KYOCERA Document Solutions Inc., Osaka-shi, Osaka (JP)

(72) Inventor: Masayuki Tobinaga, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/697,484

(22) Filed: Apr. 27, 2015

(65) Prior Publication Data
US 2015/0347062 A1    Dec. 3, 2015

(30) Foreign Application Priority Data

May 30, 2014    (JP) .................................. 2014-112592

(51) Int. Cl.
*G06F 3/12*    (2006.01)

(52) U.S. Cl.
CPC ............ *G06F 3/1204* (2013.01); *G06F 3/1253* (2013.01); *G06F 3/1292* (2013.01)

(58) Field of Classification Search
None
See application file for complete search history.

(56) References Cited

U.S. PATENT DOCUMENTS

| 8,885,196 B2* | 11/2014 | Tsuji ..................... G06F 3/1204 358/1.1 |
| 2013/0194634 A1* | 8/2013 | Sankaranarasimhan G06F 3/1296 358/1.15 |

FOREIGN PATENT DOCUMENTS

JP    2005332118 A    12/2005

OTHER PUBLICATIONS

Rick Broida, Select Multiple Files in Any Window, PCWorld, Feb. 2009.*

* cited by examiner

*Primary Examiner* — Paul F Payer
(74) *Attorney, Agent, or Firm* — Alleman Hall McCoy Russell & Tuttle LLP

(57) ABSTRACT

A mobile terminal includes a motion detecting portion, a selection processing portion, and a transmission processing portion. The motion detecting portion is configured to detect a motion of shaking the mobile terminal. The selection processing portion is configured to select, as print targets, one or more documents. The transmission processing portion is configured to transmit a print request for the one or more documents selected by the selection processing portion when the motion detecting portion detects a motion of shaking the mobile terminal.

2 Claims, 4 Drawing Sheets

MOBILE TERMINAL AND METHOD FOR SELECTING DOCUMENTS AND GENERATING PRINT REQUESTS

INCORPORATION BY REFERENCE

This application is based upon and claims the benefit of priority from the corresponding Japanese Patent Application No. 2014-112592 filed on May 30, 2014, the entire contents of which are incorporated herein by reference.

BACKGROUND

The present disclosure relates to a mobile terminal that is able to transmit a print request for a document, and to a print request method for use in the mobile terminal.

There is known a technology, for use in, for example, a mobile terminal such as a mobile phone, for detecting a motion of the mobile terminal by using a vibration sensor or an acceleration sensor and inputting information corresponding to the detected motion.

SUMMARY

A mobile terminal according to an aspect of the present disclosure includes a motion detecting portion, a selection processing portion, and a transmission processing portion. The motion detecting portion is configured to detect a motion of shaking the mobile terminal. The selection processing portion is configured to select, as print targets, one or more documents. The transmission processing portion is configured to transmit a print request for the one or more documents selected by the selection processing portion when the motion detecting portion detects a motion of shaking the mobile terminal.

A print request method according to another aspect of the present disclosure is a print request method executed in a mobile terminal including a selection processing portion configured to receive an operation for selecting one or more documents as print targets. The print request method includes: a motion detecting step of detecting a motion of shaking the mobile terminal; and a transmission step of transmitting a print request for the one or more documents selected by the selection processing portion when the detecting step detects the motion of shaking the mobile terminal.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

The following describes an embodiment of the present disclosure with reference to the accompanying drawings for the understanding of the invention. It should be noted that the following description is an example of a specific embodiment of the present invention and should not limit the technical scope of the invention.

<Printing System 1>

Figure 1:
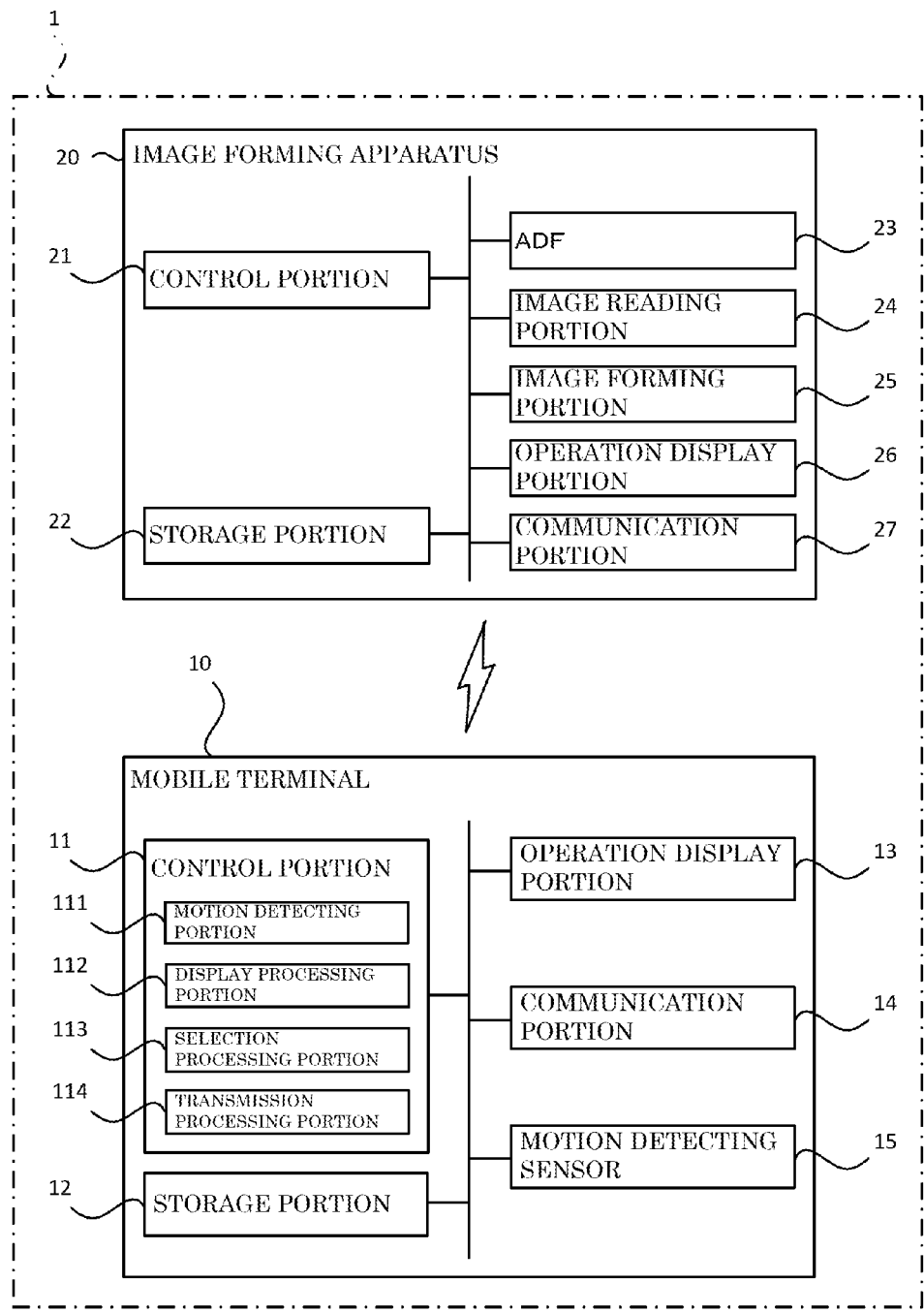
FIG. 1 is a block diagram showing the configuration of a printing system according to an embodiment of the present disclosure.

As shown in FIG. 1, a printing system 1 according to an embodiment of the present disclosure includes a mobile terminal 10 and an image forming apparatus 20. The mobile terminal 10 and the image forming apparatus 20 can communicate with each other based on Bluetooth (registered trademark) which is a short-distance wireless communication standard. It is noted that the mobile terminal 10 and the image forming apparatus 20 may be configured to communicate with each other via a network based on any other communication standard such as a wireless LAN standard.

<Mobile Terminal 10>

As shown in FIG. 1, the mobile terminal 10 includes a control portion 11, a storage portion 12, an operation display portion 13, a communication portion 14, and a motion detecting sensor 15. The mobile terminal 10 is a mobile communication terminal that can be carried by the user, and is, for example, a smartphone, a mobile phone, a tablet terminal, PDA, or the like.

The control portion 11 includes control equipment such as CPU, ROM, RAM, and EEPROM that are not shown, and controls the operation of the mobile terminal 10 by executing control programs stored in the ROM, by using the CPU. It is noted that the control portion 11 may be an electronic circuit such as an integrated circuit (ASIC).

The storage portion 12 may be a nonvolatile storage such as a flash memory, and the control portion 11 can read and write information from/to the storage portion 12. Specifically, the storage portion 12 stores various types of control programs that are executed by the control portion 11. In addition, the storage portion 12 can store scan data that is received from the image forming apparatus 20, or various types of documents that can be transmitted to the image forming apparatus 20. It is noted that in the present embodiment, the term "document" refers to such information that contains various types of contents such as texts, tables, images, photographs and the like that can be printed by the image forming apparatus 20.

The operation display portion 13 includes a display portion and an operation portion. The display portion is, for example, a liquid crystal panel that displays various types of information in response to control instructions from the control portion 11. The operation portion includes a touch panel for detecting a touch operation of the user touching an operation key displayed on the display portion. Here, the touch panel of the operation display portion 13 has a multi-touch function for detecting a plurality of touch operations at the same time. It is noted that the operation display portion 13 is an example of the display portion and the touch detecting portion.

The communication portion 14 performs a communication with an external apparatus such as the image forming apparatus 20 based on a predetermined wireless communication standard. Specifically, the communication portion 14 supports Class 2 Bluetooth (registered trademark) transmission level and can execute a wireless communication with an external communication apparatus that is present within a range of approximately 10 m by a radio wave intensity of 2.5 mW. It is noted that the data communication method based on Bluetooth is well-known, and description thereof is omitted. It is noted that the communication portion 14 may perform communications based on any other short-distance wireless communication standard such as NFC (Near Field Communication) or a wireless LAN standard such as an IEEE standard. For example, the communication portion 14 may perform a wireless communication with an external communication apparatus that is present within a communication range of approximately 10 cm from the mobile terminal 10, by using a frequency band of 13.56 MHz based on the NFC.

The motion detecting sensor 15 is, for example, a three-axis acceleration sensor that detects motions of the mobile terminal 10 in the horizontal and vertical directions (up-down direction, left-right direction and front-rear direction), and detects the presence or absence of a motion of shaking the mobile terminal 10 and the direction of the shaking motion. It is noted that the motion detecting sensor 15 may include one or more vibration sensors, acceleration sensors, displacement sensors or the like as far as it can detect the motion of shaking the mobile terminal 10.

<Image Forming Apparatus 20>

As shown in FIG. 1, the image forming apparatus 20 is a multifunction peripheral including a control portion 21, a storage portion 22, an ADF 23, an image reading portion 24, an image forming portion 25, an operation display portion 26, and a communication portion 27. It is noted that the image forming apparatus 20 may be an image forming apparatus such as a printer, a facsimile apparatus, or a copier.

The control portion 21 includes control equipment such as CPU, ROM, RAM, and EEPROM that are not shown, and controls the operation of the image forming apparatus 20 by executing control programs stored in the ROM, by using the CPU. It is noted that the control portion 21 may be an electronic circuit such as an integrated circuit (ASIC).

Specifically, the control portion 21 executes a print job for printing, by using the image forming portion 25, a document received from the mobile terminal 10 or from an external apparatus such as a personal computer, or a document stored in the storage portion 22.

The storage portion 22 is a storage such as SSD (Solid State Drive) or HDD (Hard Disk Drive), wherein the control portion 21 can read or write information from/to the storage portion 22. Specifically, the storage portion 22 stores the various types of programs executed by the control portion 21. In addition, the storage portion 22 stores documents received from the mobile terminal 10.

The ADF 23 is an automatic document feeding device that automatically feeds a reading target sheet. The image reading portion 24 is configured to read image data, by using an image sensor such as CCD or CIS, from a sheet fed by the ADF 23 or a sheet placed on a document sheet table. The image forming portion 25 is configured to form an image on a sheet based on the image data by the electrophotography or ink jet method.

The operation display portion 26 includes a display portion and an operation portion. The display portion is, for example, a liquid crystal display, and displays various types of information in response to control instructions from the control portion 21. The operation portion is composed of a touch panel or the like and receives various types of input operations performed by the user.

The communication portion 27 performs a communication with an external apparatus such as the mobile terminal 10 based on a predetermined wireless communication standard. Specifically, the communication portion 14 supports Class 2 Bluetooth (registered trademark) transmission level and can execute a wireless communication with an external communication apparatus that is present within a range of approximately 10 m by a radio wave intensity of 2.5 mW. It is noted that the data communication method based on Bluetooth is well-known, and description thereof is omitted. It is noted that the communication portion 27 may perform communications based on any other short-distance wireless communication standard such as NFC (Near Field Communication) or a wireless LAN standard such as an IEEE standard. For example, as in the mobile terminal 10, the communication portion 27 may perform a wireless communication with an external communication apparatus that is present within a communication range of approximately 10 cm from the image forming apparatus 20, by using a frequency band of 13.56 MHz based on the NFC.

Meanwhile, in the printing system 1, the mobile terminal 10 can transmit a print request to the image forming apparatus 20. Here, if, after selecting one or more documents for the print targets, the user has to operate an operation key to start the printing, it requires time and effort to search and operate the operation key. On the other hand, as described below, the mobile terminal 10 of the present embodiment provides a simple operation for transmitting the print request.

Specifically, the control portion 11 functions as a motion detecting portion 111, a display processing portion 112, a selection processing portion 113, and a transmission processing portion 114 when it executes, by using the CPU, the control programs stored in the ROM.

The motion detecting portion 111 executes a process for detecting the presence or absence of the motion of shaking the mobile terminal 10, by using the motion detecting sensor 15. The display processing portion 112 displays a plurality of documents as the selection candidates on the operation display portion 13. The selection processing portion 113 selects one or more documents as the print targets. The transmission processing portion 114 transmits, to the image forming apparatus 20, a print request for the one or more documents selected by the selection processing portion 113 when the motion detecting portion 111 detects the presence of the motion of shaking the mobile terminal 10.

[Print Request Process]

Figure 2:
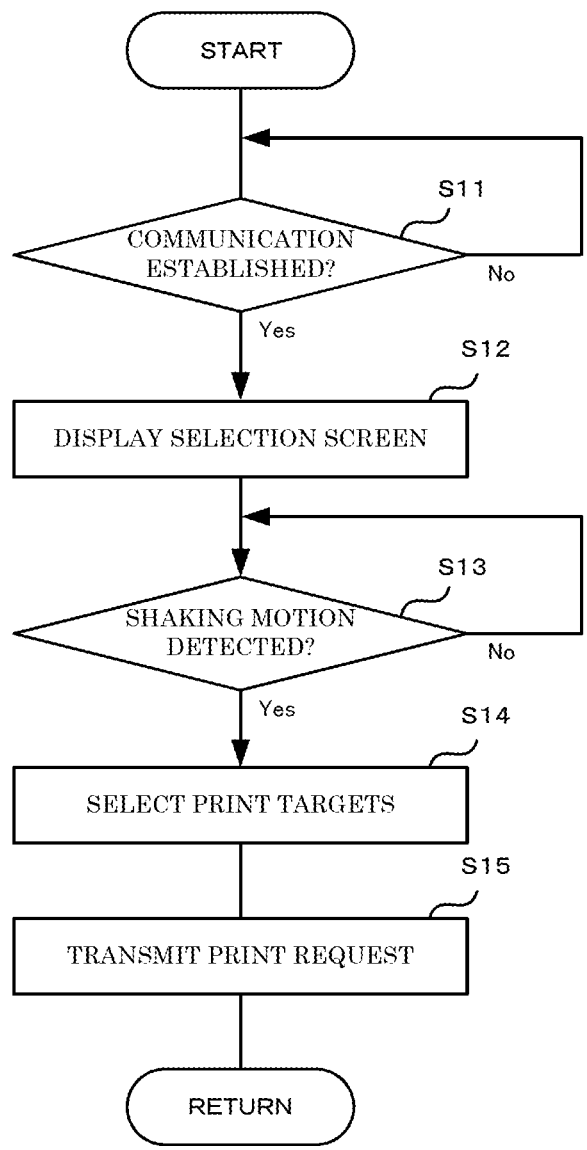
FIG. 2 is a flowchart showing an example of a print request process that is executed by a mobile terminal according to an embodiment of the present disclosure.

The following describes an example of the procedure of a print request process that is executed by the control portion 11 based on the control programs in the printing system 1, with reference to the flowchart shown in FIG. 2. The print request process is executed by the control portion 11 when an operation for starting printing of documents is performed on the mobile terminal 10, or when an operation for displaying a list of documents that are the candidates for print targets, such as an operation for referring to the documents, is performed on the mobile terminal 10. It is noted that it is possible to regard the present disclosure as an invention of a print request method in which the control portion 11 executes the procedures of the print request process.

<Step S11>

First, in step S11, the control portion 11 determines whether or not a predetermined communication has been established with the image forming apparatus 20. Upon determining that the predetermined communication has been established with the image forming apparatus 20 (Yes side at S11), the control portion 11 executes the process of step S12 and onwards. On the other hand, upon determining that the predetermined communication has not been established with the image forming apparatus 20 (No side at S11), the control portion 11 repeatedly executes the determination process in step S11 without executing the process of step S12 and onwards.

<Step S12>

Next, in step S12, the control portion 11 displays a selection screen on the operation display portion 13 in such a way as to allow one or more documents to be selected as the print targets. It is noted that one or more documents are displayed on the selection screen as the selection candidates. The process of step S12 is executed by the display processing portion 112 of the control portion 11.

Specifically, the control portion 11 is configured to display a list of documents as a list of selection candidates, wherein the documents in the list may be stored in the storage portion 12 of the mobile terminal 10, or may be stored in the storage portion 22 of the image forming apparatus 20. It is noted that when a communication has been established with the image forming apparatus 20, the control portion 11 selects one image forming apparatus based on a user operation performed on the operation display portion 13. In addition, the control portion 11 may identify a personal folder associated with a user who is associated with the mobile terminal 10, from among a plurality of personal folders that are associated with a plurality of users in the storage portion 22 of the image forming apparatus 20, and then read documents stored in the specified personal folder.

Figure 3A:
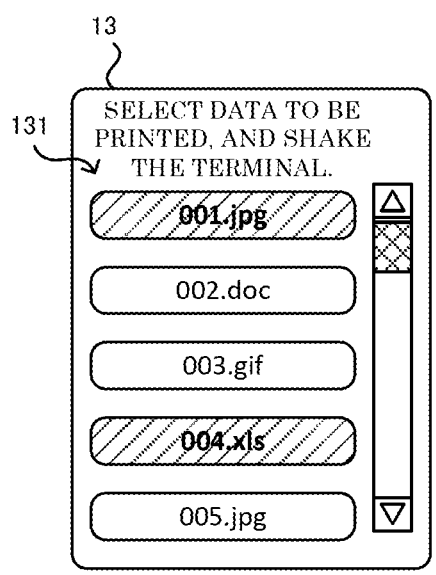
FIG. 3A and FIG. 3B are diagrams showing examples of execution results of the print request process that is executed by the mobile terminal according to the first embodiment of the present disclosure.
Figure 3B:
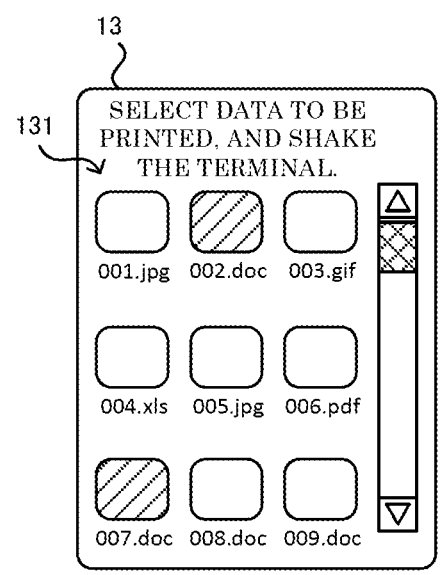

As shown in FIG. 3A, a candidate display area 131 is displayed on the operation display portion 13, wherein one or more selection candidates for the print targets are displayed in the candidate display area 131. Specifically, in the example shown in FIG. 3A, five documents, namely, "001.jpg", "002.doc", "003.gif", "004.xls" and "005.jpg", are displayed in the candidate display area 131. In addition, the example of FIG. 3A shows a state where two documents "001.jpg" and "004.xls" are touched by two fingers of the user in such a way as to be selected as the print targets. It is noted that the user may use three or more fingers to select three or more documents at the same time. FIG. 3B shows another example in which the documents are arranged in a different manner, wherein nine documents, namely, "001.jpg", "002.doc", "003.gif", "004.xls", "005.jpg", "006.pdf", "007.doc", "008.doc" and "009.doc", are displayed in the candidate display area 131, and among these, "002.doc" and "007.doc" are selected.

<Step S13>

Next, in step S13, the control portion 11 determines, by using the motion detecting sensor 15, whether or not the motion of shaking the mobile terminal 10 was detected. It is noted that the process of step S13 is executed by the motion detecting portion 111 of the control portion 11. Here, the motion of shaking the mobile terminal 10 may be, for example, a motion of moving the mobile terminal 10 in one direction, or a reciprocal motion of moving the mobile terminal 10 in one direction and pulling back in the opposite direction. As another example, the control portion 11 may recognize a motion of reciprocally moving the mobile terminal 10 a plurality of times, as the motion of shaking the mobile terminal 10. Upon determining that the motion of shaking the mobile terminal 10 was detected (Yes side at S13), the control portion 11 moves the process to step S14. On the other hand, upon determining that the motion of shaking the mobile terminal 10 has not been detected (No side at S13), the control portion 11 repeatedly executes the determination process of step S13.

<Step S14>

In step S14, the control portion 11 selects documents to be the print targets, based on the documents that are currently selected on the operation display portion 13. Specifically, the control portion 11 selects all of one or more documents that are selected by the touch operation detected on the operation display portion 13 when the motion of shaking the mobile terminal 10 is detected. The process of step S14 is executed by the selection processing portion 113 of the control portion 11.

<Step S15>

Subsequently, in step S15, the control portion 11 transmits a print request to the image forming apparatus 20, wherein the print request requests to print all the documents selected in step S14. The process of step S15 is executed by the transmission processing portion 114 of the control portion 11. It is noted that in step S15, the control portion 11 transmits the print request to the image forming apparatus 20 which is a communication partner for which it was determined in step S11 that the communication has been established.

In the case where documents stored in the storage portion 12 of the mobile terminal 10 are to be printed, the control portion 11 transmits the documents to the image forming apparatus 20 together with the print request in step S15. In addition, in the case where documents stored in the storage portion 22 of the image forming apparatus 20 are to be printed, the control portion 11 transmits the print request to the image forming apparatus 20 together with identification information such as file names or path names that identify the documents, in step S15. It is noted that when documents stored in the storage portion 22 of the image forming apparatus 20 are in a data format by which the documents cannot be printed by the image forming apparatus 20, the control portion 11 may read the documents, convert them to another data format so that the documents can be printed by the image forming apparatus 20, and then transmit them to the image forming apparatus 20.

As described above, in the mobile terminal 10, the user does not need to search and operate an operation key to transmit a print request but can transmit the print request easily and smoothly by performing the motion of shaking the mobile terminal 10. In addition, in the mobile terminal 10, the user does not need to perform an operation of selecting documents in advance because the mobile terminal 10 transmits a print request by selecting, as the print targets, documents that were being selected when the motion of shaking the mobile terminal 10 was performed. That is, the user can easily print the documents only by performing the touch operation on the print target documents and performing the motion of shaking the mobile terminal 10. In addition, there is no need for the mobile terminal 10 to display, on the operation screen of the operation display portion 13, an operation key for transmitting a print request. It is noted that in the mobile terminal 10, the control portion 11 may transmit a print request to the image forming apparatus 20 when an operation for confirming selected documents is performed on the selection screen in advance and then the motion of shaking the mobile terminal 10 is performed.

Second Embodiment

According to the above-described example of the first embodiment, one or more documents on which the touch operation is performed are selected as the print targets from among a list of documents displayed on the selection screen (see FIG. 3A and FIG. 3B) on the operation display portion 13 of the mobile terminal 10. The present embodiment describes another example for selecting print targets on the selection screen with reference to FIG. 4A and FIG. 4B. Here, FIG. 4A and FIG. 4B are diagrams showing other examples of the selection screen in which documents are arranged in different manners.

Specifically, the control portion 11 selects, as the print targets, two documents that are selected from among a plurality of documents displayed on the operation display portion 13, and one or more document that are displayed between the two documents. That is, by selecting two documents, a range of documents to be selected as the print targets is specified.

Figure 4A:
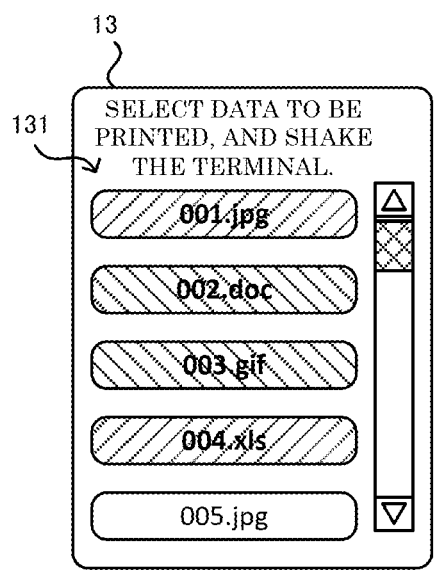
FIG. 4A and FIG. 4B are diagrams showing examples of execution results of the print request process that is executed by the mobile terminal according to the second embodiment of the present disclosure.

For example, the example of FIG. 4A shows that two documents "001.jpg" and "004.xls", among documents "001.jpg", "002.doc", "003.gif", "004.xls" and "005.jpg", are touched by two fingers of the user by the touch operation. In that case, four documents in total, namely, the two documents "001.jpg" and "004.xls", and two documents "002.doc" and "003.gif" sandwiched by the two documents "001.jpg" and "004.xls" are selected as the print targets.

Figure 4B:
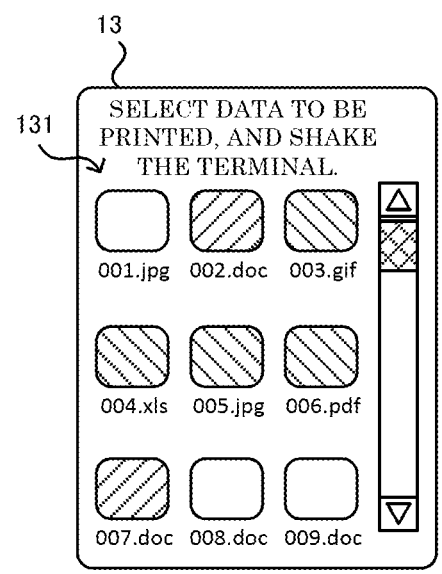

Similarly, the example of FIG. 4B shows that two documents "002.doc" and "007.doc", among documents "001.jpg", "002.doc", "003.gif", "004.xls", "005.jpg", "006.pdf", "007.doc", "008.doc" and "009.doc", are by two fingers of the user by the touch operation. In that case, six documents in total, namely, the two documents "002.doc" and "007.doc", and four documents "003.gif", "004.xls", "005.jpg" and "006.pdf" are selected as the print targets.

Third Embodiment

In the mobile terminal 10, a configuration, in which the selection methods of the first embodiment and the second embodiment can be switched from each other, can be another embodiment. Specifically, a selection mode of the first embodiment in which one or more documents selected by the touch operation detected on the operation display portion 13, is set as the first selection mode in advance. In addition, a selection mode of the second embodiment is set as the second selection mode in advance, wherein in the selection mode of the second embodiment, two documents selected by the touch operation detected on the operation display portion 13, and one or more document that are displayed between the two documents, are selected. In the present embodiment, the control portion 11 selectively executes the first selection mode and the second selection mode.

For example, the control portion 11 may switch between the first selection mode and the second selection mode based on a user operation performed in the initial setting of the mobile terminal 10. In addition, the control portion 11 may display, on the selection screen (see FIG. 3A and FIG. 3B, or FIG. 4A and FIG. 4B), an operation key that is performed to switch between the first selection mode and the second selection mode, and the first selection mode and the second selection mode may be switched from each other based on an operation performed on the operation key. Furthermore, when, on the operation screen, a plurality of documents are selected within a predetermined operation wait time, the control portion 11 may execute the first selection mode; and when two documents are selected outside the operation wait time, the control portion 11 may execute the second selection mode.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A mobile terminal comprising:
a motion detecting portion configured to detect a motion of shaking the mobile terminal;
a selection processing portion configured to select, as print targets, one or more documents;
a transmission processing portion configured to transmit a print request for the one or more documents selected by the selection processing portion when the motion detecting portion detects a motion of shaking the mobile terminal;
a display processing portion configured to display a plurality of documents on a display portion as selection candidates; and
a touch detecting portion configured to detect a touch operation that is performed to select one or more documents from among the plurality of documents displayed on the display portion; wherein
the selection processing portion selectably executes a first selection mode and a second selection mode, wherein in the first selection mode, the selection processing portion selects, as the print targets, the one or more documents selected by the touch operation detected by the touch detecting portion, and in the second selection mode, the selection processing portion selects, as the print targets, two documents selected by the touch operation detected by the touch detecting portion and one or more documents displayed between the two documents; and
when a plurality of documents are selected within a predetermined operation wait time, the selection processing portion executes the first selection mode, and when two documents are selected outside the operation wait time, the selection processing portion executes the second selection mode.

2. A print request method executed in a mobile terminal including a selection processing portion configured to receive an operation for selecting one or more documents as print targets and a touch detecting portion configured to detect a touch operation that is performed to select one or more documents from among a plurality of documents displayed on a display portion, the print request method comprising:
a motion detecting step of detecting a motion of shaking the mobile terminal;
a transmission step of transmitting a print request for the one or more documents selected by the selection processing portion when the detecting step detects a motion of shaking the mobile terminal; and
a display step of displaying the plurality of documents on the display portion as selection candidates; wherein
a first selection mode and a second selection mode can be selectably executed in the selection processing portion, wherein in the first selection mode, the one or more documents selected by the touch operation detected by the touch detecting portion are selected as the print targets, and in the second selection mode, two documents selected by the touch operation detected by the touch detecting portion and one or more documents displayed between the two documents are selected as the print targets; and
when a plurality of documents are selected within a predetermined operation wait time, the first selection mode is executed, and when two documents are selected outside the operation wait time, the second selection mode is executed.

* * * * *